(12) United States Patent
Esterson et al.

(10) Patent No.: US 6,216,306 B1
(45) Date of Patent: Apr. 17, 2001

(54) GRILL CLEANING BRUSH AND SCRAPER

(75) Inventors: Robin Esterson, New York, NY (US); Kristie M. Killen, Lighthouse Point, FL (US); Donald R. Lamond, Lynbrook, NY (US); Paul Lacotta, Glen Rock, NJ (US); Dylan Akinrele, Brooklyn, NY (US); Bill Fiebel, Clifton, NJ (US)

(73) Assignee: The Coleman Company, Inc., Wichita, KS (US)

( * ) Notice: Subject to any disclaimer, the term of this patent is extended or adjusted under 35 U.S.C. 154(b) by 0 days.

(21) Appl. No.: 09/373,817

(22) Filed: Aug. 13, 1999

(51) Int. Cl.$^7$ ........................................................ A47L 13/12
(52) U.S. Cl. ........................... 15/111; 15/143.1; 15/176.1; 15/236.01; D4/118; D4/138; D32/42; D32/48; D32/49
(58) Field of Search .................................... 15/111, 143.1, 15/176.1, 176.4, 176.5, 176.6, 236.01, 236.05–236.09; D4/118, 138; D32/42, 46, 48, 49, 51, 52

(56) References Cited

U.S. PATENT DOCUMENTS

| D. 368,999 | * | 4/1996 | Chen | D32/48 |
| D. 381,483 | * | 7/1997 | Hartman | D32/48 |
| D. 424,767 | * | 5/2000 | Shea | D32/48 |
| 701,503 | * | 6/1902 | Plummer | 15/236.01 X |
| 856,168 | * | 6/1907 | Lykken | 15/111 X |
| 1,145,966 | * | 7/1915 | Bergmann | 15/143.1 X |
| 1,627,515 | * | 5/1927 | Laird | 15/236.01 X |
| 1,807,281 | * | 5/1931 | Cross | 15/176.1 X |
| 2,618,004 | * | 11/1952 | Heyder | 15/236.01 |
| 2,807,814 | * | 10/1957 | Leeming | 15/111 |
| 2,824,323 | * | 2/1958 | Tos et al. | 15/111 X |
| 3,363,316 | * | 1/1968 | Skarsten | 15/236.05 X |
| 4,091,579 | * | 5/1978 | Giangiulio | 15/111 X |
| 4,668,302 | * | 5/1987 | Kolodziej et al. | 15/236.01 X |
| 4,741,064 | * | 5/1988 | Riegert et al. | 15/111 |
| 5,471,700 | * | 12/1995 | Pereira | 15/236.01 X |

FOREIGN PATENT DOCUMENTS

| 1910180 | * | 2/1970 | (DE) | 15/176.1 |
| 1389252 | * | 1/1965 | (FR) | 15/236.01 |
| 2277900 | * | 11/1994 | (GB) | 15/236.01 |

* cited by examiner

*Primary Examiner*—Mark Spisich
(74) *Attorney, Agent, or Firm*—Kramer Levin Naftalis & Frankel LLP

(57) ABSTRACT

A grill cleaning brush and scraper having a replaceable cleaning bristle head with scraper blade. A second handle grip for improved leverage and force application permits more efficient cleaning with less effort. The device also provides a soft-grip handle and curved neck portion for improved comfort during use.

16 Claims, 5 Drawing Sheets

GRILL CLEANING BRUSH AND SCRAPER

FIELD OF THE INVENTION

The present invention relates generally to devices for cleaning cooking grills and more particularly to combination brush/scrapers for cleaning grills.

BACKGROUND INFORMATION

Grill brushes and scrapers are generally known in the art and various types are commercially available. Several features are absent from prior art devices which would significantly enhance the utility of the basic design. For example, provision of a second handle would provide leverage for extra cleaning power. In addition, if the brush head could be replaced with a clean, fresh brush head, unnecessary waste of a functional tool handle would be eliminated as a replacement cleaning head could be purchased and installed. Further, the cleaning head could be removed and cleaned, thus providing a more sanitary tool for use with a grill. It also would be highly desirable if the scraper blade is fabricated from a very hard, oxidation-resistant metal such as stainless steel. Such a choice in material would provide a more durable and long-lasting device since other common metals leads to pitting and rapid degradation of the scraper blade over time. Likewise, it would be desirable if the bristles of the brush portion of the device are also made of a strong, inert material such as stainless steel.

SUMMARY OF THE INVENTION

An object of the present invention is to provide a grill brush and scraper having the capability of ready replacement of the cleaning head assembly, thereby extending the useful lifetime of the grill brush/scraper.

Another object of the present invention is to provide a grill brush having a second handle which would permit the application of additional force so as to clean grill surfaces more effectively.

Another object of the present invention is to provide a grill brush and scraper having a soft-grip handle and curved neck portion which would make use of the device more comfortable.

Yet another object of the present invention is to provide a grill cleaner and scraper having a scraper blade which is made from an oxidation-resistant metal so as to provide a long-lasting device by selecting a blade material which resists degradation over time, such as stainless steel.

A further object of the present invention is to provide a cleaning brush and scraper for grills in which the bristles of the brush portion of the device are also made of a long-lasting, oxidation-resistant material, such as stainless steel.

It will be understood that the foregoing general description as well as the following detailed description are exemplary and explanatory of the invention but are not intended to be restrictive thereof.

Figure 1:
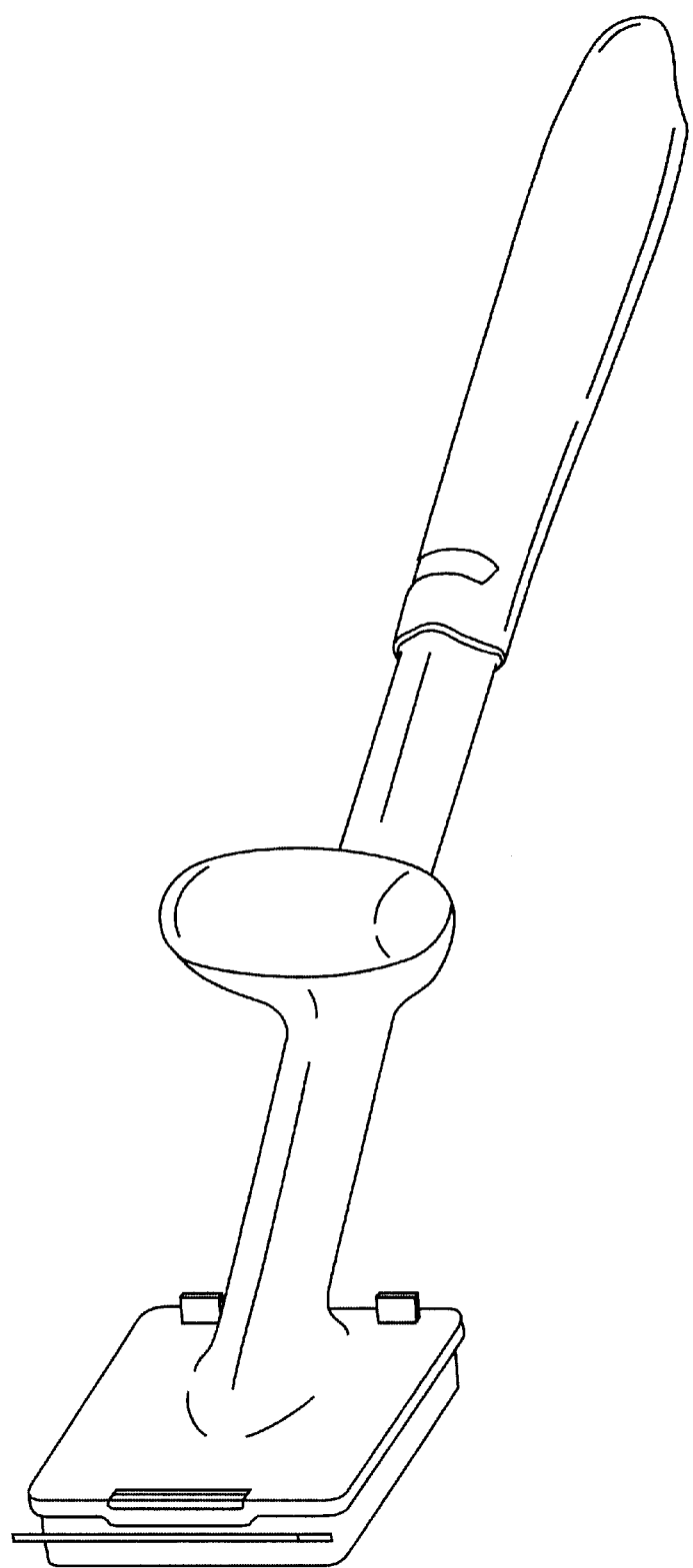
FIG. 1 is a front perspective diagrammatic view of an exemplary grill brush and scraper in accordance with an embodiment of the present invention.
Figure 2:
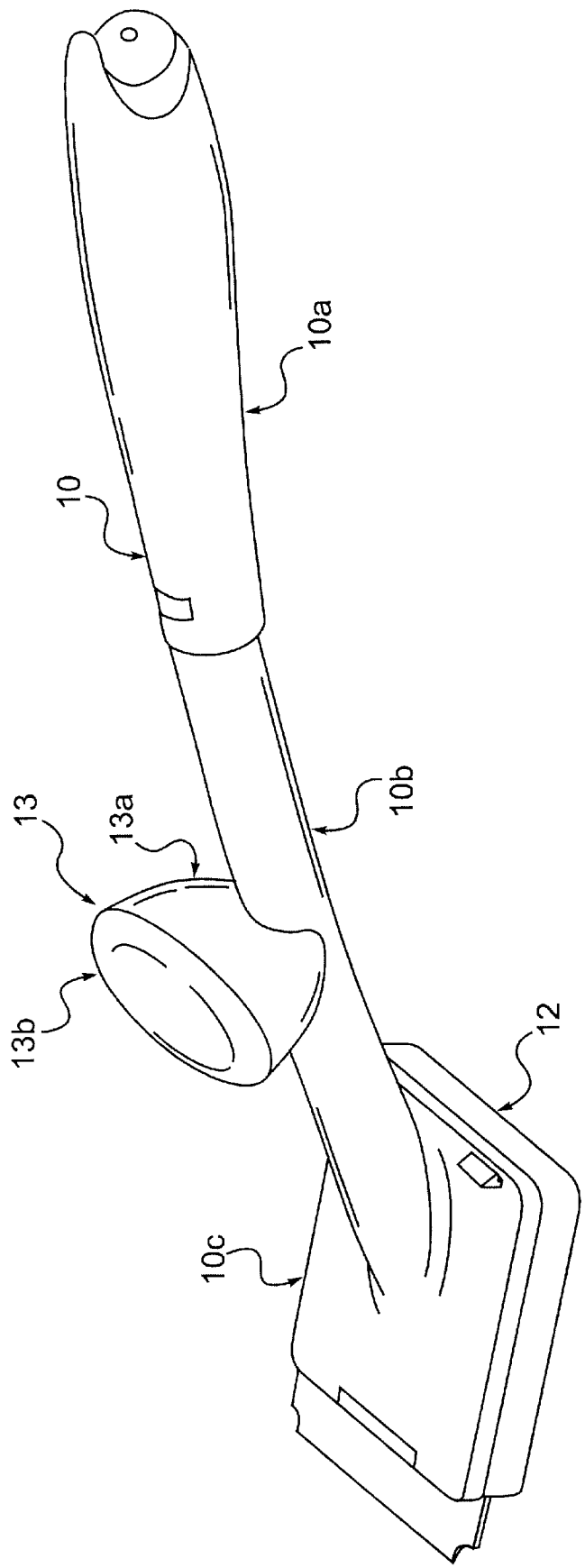
FIG. 2 is a side perspective view of an exemplary grill brush and scraper according to an embodiment of the present invention.

Other features and advantages of the present invention will be apparent from the following description of the exemplary embodiments thereof, and from the claims.

DETAILED DESCRIPTION

Referring now more particularly to the exemplary embodiments of the present invention illustrated in the accompanying FIGS. 1–5, there is illustrated a brush-scraper combination tool for cleaning grills and similar structures.

A grill cleaning tool according to an exemplary embodiment of the present invention includes, for example, handle portion 10 and brush/scraper cleaning head portion 12. Handle portion 10 includes, for example, handle grip section 10a and body core section 10b. The handle grip section 10a is attached, for example, to the upper end of the body core section 10b. Handle grip section 10a may be formed of, for example, a single material or have a core of a suitable hard material with a coated surface or overmold grip made from a deformable material which affords a comfortable grip for the hand of a user. The deformable material for handle grip section 10a may be overmold injected and may be any suitable plastic, for example, Santoprene™ thermoplastic rubber.

The body core section 10b may be injection moldable, and made from a suitable plastic. For example, the body core section 10b may be fabricated from a thermoplastic such as polypropylene. The handle grip section 10a may also be modified to accept a hanging ring 16, such as a flat metal or plastic piece having a suitably dimensioned opening from which the brush/scraper may hang. The hanging ring 16 may be removable or permanently bonded to the handle grip section 10a by any means known in the art, including a friction fit, glue bond or riveting.

The handle portion 10 may be formed as an integral piece or from two separate pieces 10a and 10b which are either releasably engageable or bound permanently by any means known in the art. If formed of an integral piece, the handle portion 10 may be formed by a variety of methods, and is readily made by thermoplastic molding. If the handle portion 10 is made of two pieces which are releasably engageable, such an engagement may entail a twist-lock, bayonet or similar type of connection. Generally, the handle portion 10 may also be prepared from any relatively strong and thermally insulating material such as wood. As illustrated in the Figures, handle 10 has a slight downward curvature to enhance the user's comfort during use of the grill brush.

The body core section 10b includes, for example, a second handle piece 13 positioned substantially centrally along the body core section 10b and substantially orthogonally with respect to the main longitudinal axis of the body core section 10b. The second handle piece 13 serves as a barrier or stop to prevent the user's hand gripping the handle piece from slipping to the lower end of the device and thereby causing injury to the user. The second handle piece 13 also may serve as an additional means of gripping the grill brush/scraper, and thereby applying more force to the point of cleaning action than can be mustered using only handle section 10a. The second handle piece 13 may be wider in dimension relative to the width of the body core section 10b so as to shield the hand while holding the handle grip section 10a and to provide a sufficiently sizeable second handle so as to provide for a more secure grip.

The second handle piece 13 is formed, for example, either as one unit integrated with the body core section 10b, or of two pieces including a base 13a, which is formed integrally with the body core section 10b, and cap 13b. The base 13a and cap 13b are attached by any means known in the art, and may be bound permanently by a pressure snap junction, by a glue seal using a standard adhesive or by thermal welding. If formed as an integral unit, the second handle piece 13 may be formed by various methods, for example, thermoplastic molding. The cap 13a is prepared from any suitable material, such as polypropylene.

The body core section 10b further includes, for example, a flat enlarged region 10c integrally formed at the lower end of the body core section 10b. The flat enlarged region 10c may be any shape, for example, round, square or rectangular, and is generally characterized in having a front edge, from which the scraper blade 15 emanates, side edges, and a rear edge. The flat enlarged region 10c may be angled with respect to the longitudinal axis of the body core section 10b so as to form an angle of between about 100 degrees and about 160 degrees, but more typically about 120 degrees. Such angling, in combination with the curvature of handle 10, provides a more comfortable configuration for cleaning grills, and permits more convenient application of cleaning power to the grill surface.

The flat enlarged region 10c is modified so as to be able to accept the detachable brush/scraper cleaning head portion 12 by, for example, a releaseable engagement.

Figure 5:
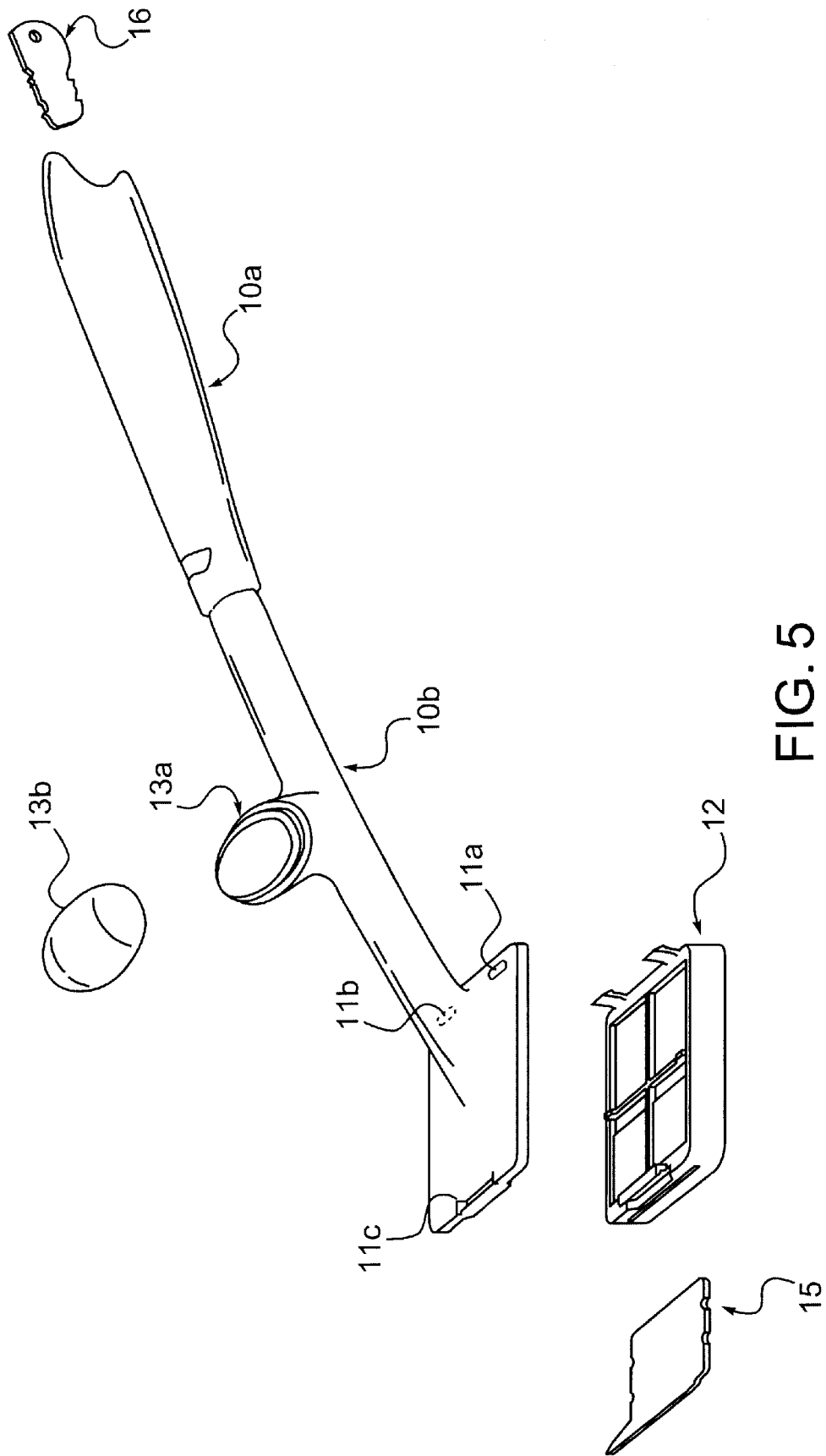
FIG. 5 is a side exploded diagrammatic view of an exemplary grill brush and scraper according to an embodiment of the present invention.

Referring to FIG. 5, brush/scraper cleaning head portion 12, which is, for example, detachable, disposable and replaceable with a new head portion, is attached to the enlarged flat region 10c by any means of stable attachment known in the art. As illustrated in the drawings, the brush/scraper head portion 12 is releaseably engageable with the flat enlarged region 10c by, for example, means of three openings 11a, 11b, 11c, two openings (11a, 11b) being disposed near one edge and one opening (11c) being located on the opposite edge modified so as to be able to accept, for example, tabs and a locking tongue, respectively.

Thus, as embodied, the brush/scraper cleaning head portion 12 may comprise three locking tongues or tabs corresponding in position to the three openings 11a, 11b, 11c on the flat enlarged region 10c. These three locking tongues or tabs permit stable attachment and retention of the brush/scraper cleaning head portion 12 to the body core section 10b.

Figure 3:
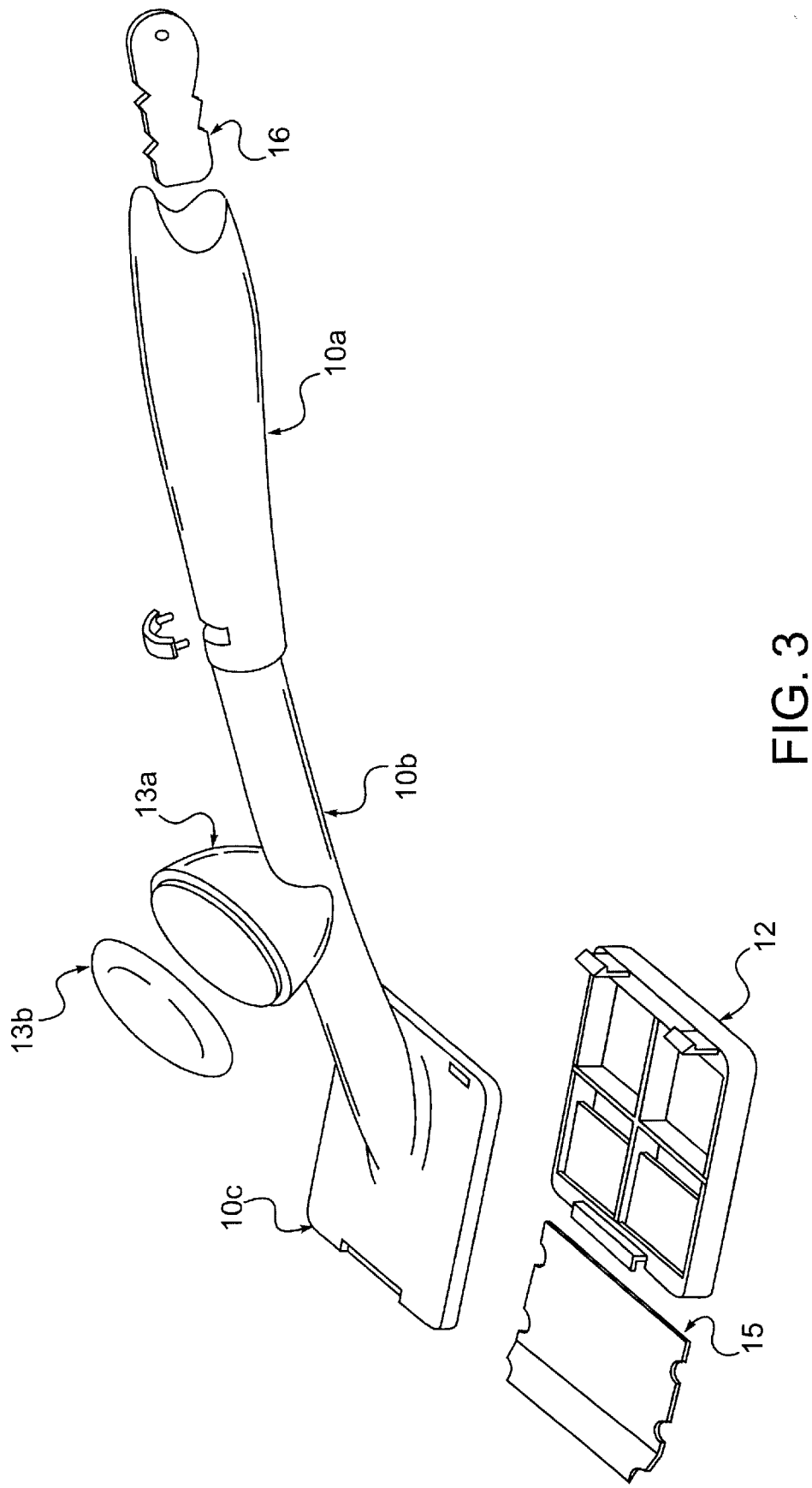
FIG. 3 is a side exploded view of an exemplary grill brush and scrapper according to an embodiment of the present invention.
Figure 4:
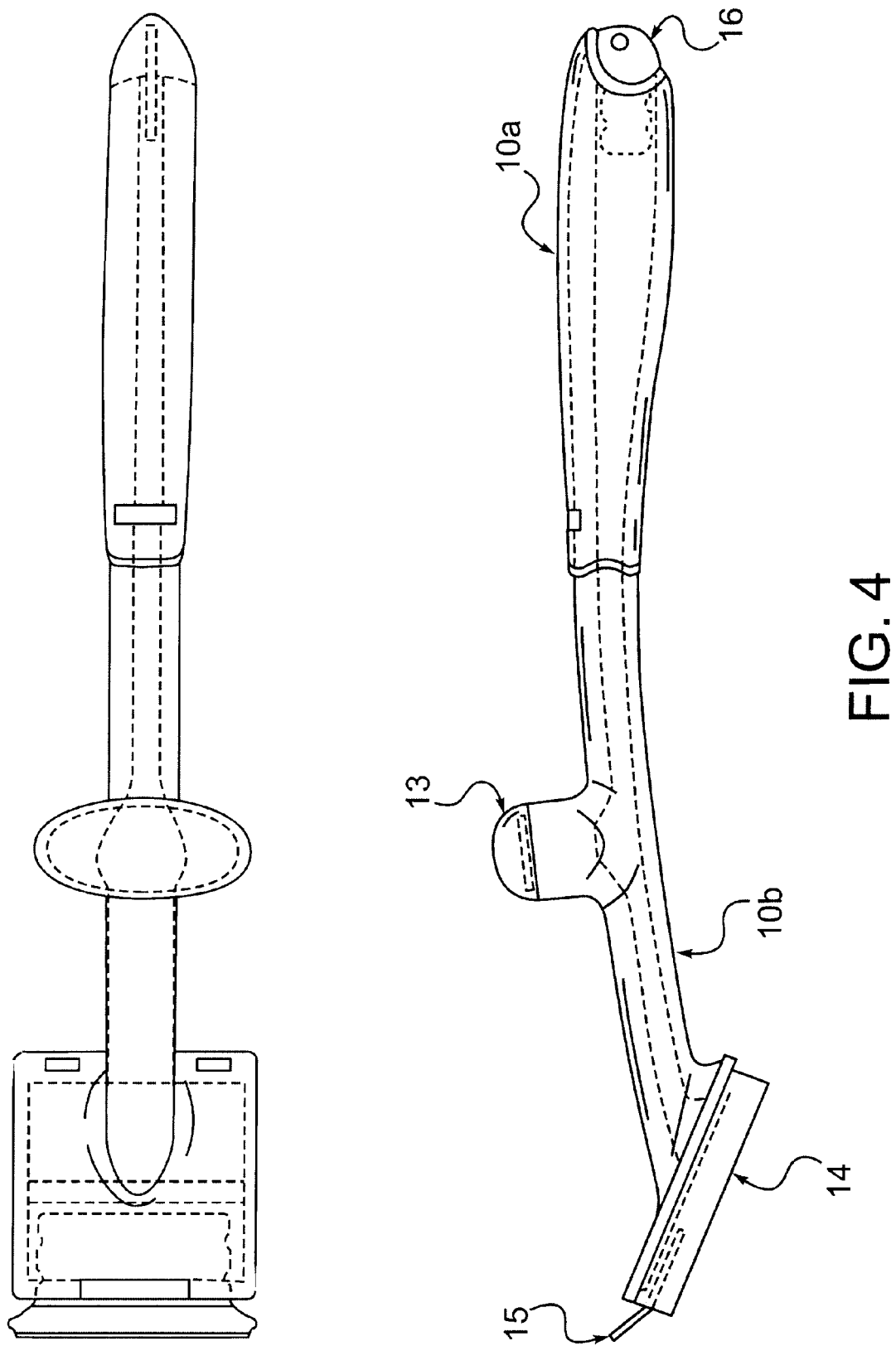
FIG. 4 is a top and side diagrammatic view of an exemplary grill brush and scraper according to an embodiment of the present invention.

Referring to FIGS. 3–5, brush/scraper cleaning head portion 12 includes, for example, a plurality of brush bristles 14 which are affixed to the brush/scraper cleaning head portion 12 so as to project from the bottom surface thereof. The brush bristles may be of substantially uniform or variable length, are stiffly resilient and made from, for example, a strong, heat-stable, oxidation-resistant metal. Suitable metals include, for example, brass and stainless steel, the latter being useful to avoid damage to porcelain grids. The brush bristles 14 are, for example, between about one-quarter (¼") and about one-half inch (½") in length, and are affixed to the brush/scraper cleaning head portion 12 in a plurality of rows, although other configurations are possible.

The bristles may be attached to the brush/scraper cleaning head portion 12 by any method known in the art so as to securely attach the bristles thereto. For example, the bristles may be embedded in a doubled-over manner in holes drilled or otherwise formed in a framework at the lower end of the brush/scraper cleaning head portion 12.

The brush/scraper cleaning head portion 12 also may include a slit traversing substantially the entire front end and adjacent to and above the framework holding the bristles so as to releaseably and stably engage scraper blade 15, which is secured by any means known in the art. As embodied, the scraper blade 15 has a series of indentations on opposite sides which contact with the sides of the slit thereby permitting the blade to be retained within the brush/scraper cleaning head portion 12 by means of friction. Other means of retention include pressure snaps and tabs.

The brush body core portion 10b can be formed to any convenient shape and size. The cross-sectional shape of the core portion 10b may be, for example, square, triangular, round or trapezoidal. As shown in FIGS. 1–5, the brush body core portion 10b is round, and is about ½" to about ¾" in diameter.

The scraper blade 15 may be formed from a single sheet-like piece of steel or other metal. Stainless steel is favored for its durable nature and strength to loosen baked-on grease. The oxidation resistance of stainless steel would make it more long-lasting. As embodied, the scraper blade 15 has an angular deflection along the working edge. The scraper blade 15 may also be entirely flat.

In operation, a user may hold the brush so that the bristles make maximum contact with the grill surface, and to use the scraper portion, may invert the grill brush/scraper so that the scraper blade 15 is slightly skewed to the vertical axis.

One of skill in the art will readily understand that the present invention is not limited to the specific embodiment shown and described, and may be further used in applications other than cleaning grills. Such additional applications include, for example, cleaning griddles, scraping paint from walls or windows, removing wall paper and cleaning rust from iron railings.

Variations of the present invention may be made which are within the scope of the present invention as defined in the accompanying claims, without departing from the principles of the present invention.

What is claimed is:

1. A device for cleaning grills, comprising:
   a releaseably engageable brush/scraper cleaning head portion including a plurality of brush bristles which are affixed to the brush/scraper cleaning head portion so as to project from a bottom surface thereof;
   a handle having a body core section and a handle grip section at an upper end of the body core section, the body core section including
      an elongate shaft having a predetermined curvature and a substantially flat enlarged region at a lower end of the body core section, the flat enlarged region having a front edge forming a slant angle with respect to a longitudinal axis of the body core section, wherein the flat enlarged region releaseably engages the brush/scraper cleaning head portion;
      a second handle piece positioned substantially centrally along the body core section and protruding orthogonally from the body core section.

2. The device according to claim 1, wherein the cleaning head portion includes a scraper blade.

3. The device according to claim 2, wherein the scraper blade is made from stainless steel.

4. The device according to claim 1, wherein the handle grip section includes a soft-grip overmold.

5. The device according to claim 4, wherein the soft-grip overmold includes a thermoplastic rubber overmold.

6. The device according to claim 1, wherein an end portion of the handle grip section includes a hanging ring, the hanging ring including one of a flat metal and a flat plastic piece having an opening therethrough.

7. The device according to claim 1, wherein the body core section is formed having integral construction.

8. The device according to claim 1, wherein the slant angle is between about 100 degrees and about 160 degrees.

9. The device according to claim 1, wherein the second handle piece is integrally formed with the body core section.

10. The device according to claim 9, wherein the second handle piece and the body core section are integrally formed of polypropylene.

11. The device according to claim 1, wherein the brush bristles are made from stainless steel.

12. The device according to claim 1, wherein the second handle piece is formed from two pieces including a base which is formed integrally with the body core section and a cap.

13. The device according to claim 1, wherein the second handle piece includes an elongated hand grip extending upwards from an upper surface of the body core section.

14. The device according to claim 1, wherein the plurality of brush bristles are arranged in a plurality of tufts.

15. The device according to claim 1, further comprising an end plate disposed in an end of the handle.

16. The device according to claim 15, wherein the end plate includes one of an opening and a bottle opener.

* * * * *